United States Patent

Hirsch

[15] 3,648,171

[45] Mar. 7, 1972

[54] ADAPTIVE EQUALIZER FOR DIGITAL DATA SYSTEMS

[72] Inventor: Donald Hirsch, Matawan, N.J.

[73] Assignee: Bell Telephone Laboratories, Incorporated, Murray Hill, N.J.

[22] Filed: May 4, 1970

[21] Appl. No.: 34,346

[52] U.S. Cl. ..................................325/42, 178/69, 328/162, 333/18

[51] Int. Cl. ..........................................................H03h 7/36

[58] Field of Search ...................178/69 R, 69 B, 69 H, 69 M; 333/18 R, 17; 325/42, 65; 328/61, 55, 162, 163

[56] References Cited

UNITED STATES PATENTS

| | | | |
|---|---|---|---|
| 3,381,245 | 4/1968 | Guanella | 333/18 X |
| 3,308,431 | 3/1967 | Hopner et al. | 325/42 |
| 3,297,951 | 1/1967 | Blasbalg | 178/69 R |

*Primary Examiner*—Benedict V. Safourek
*Attorney*—R. J. Guenther and Kenneth B. Hamlin

[57] ABSTRACT

The automatic time-domain equalizer is modified to improve its signal-to-noise and impulse-response dispersal performance by supplementing the basic prior art equalizer with a final equalizer whose tap attenuators are controlled by correlations of the output of the basic equalizer with a distortion error signal. The reference input to the final equalizer is the appropriately delayed signal to be equalized. Two cascade equalization sections substantially eliminate from the final output the noise and echo components that are normally generated in the basic equalizer when used alone.

5 Claims, 5 Drawing Figures

Patented March 7, 1972

3,648,171

3 Sheets-Sheet 1

INVENTOR
D. HIRSCH
BY
J. P. Kearns
ATTORNEY

Patented March 7, 1972 3,648,171

3 Sheets-Sheet 3

ADAPTIVE EQUALIZER FOR DIGITAL DATA SYSTEMS

BACKGROUND OF THE INVENTION

1. Field of the Invention

This invention relates to equalizers for limited bandwidth data transmission systems and specifically to improvements in the noise performance of such equalizers.

2. Description of the Prior Art

Two types of time-domain equalizers for synchronous data transmission systems are known to the prior art: the recursive and the nonrecursive. Both types employ delay lines tapped at the data-symbol interval. The nonrecursive equalizer selectively attenuates each tap output, combines and feeds forward the attenuated outputs to form the equalized output, and derives an error control signal for the attenuators from a comparison of the equalizer output with a desired output based on some distortion criterion. The mean-square error in particular is a commonly chosen distortion criterion. The mean-square error difference is known to be a convex function of the attenuator settings. Therefore repeated attenuator adjustments so determined tend to converge on the minimum residual distortion. Due to this convergence property the nonrecursive filter has proved to be a powerful tool in minimizing the effects of linear distortion in band-limited transmission media. An example of the adaptive nonrecursive transversal equalizer is disclosed in R. W. Lucky U.S. Pat. No. 3,414,819, issued Dec. 3, 1968.

The recursive equalizer selectively attenuates each tap output also, but two sets of summation result. The summation of one set is fed forward to form an equalized output, as in the nonrecursive equalizer; but the summation of the other set is fed back and combined with either the input signal to be equalized or the summation of the one set. Whereas the feed-forward attenuator settings determine the zeros of a transfer function generated by the equalizer in the same manner as the nonrecursive equalizer, the feedback attenuator settings determine the poles or frequencies of natural resonance of the same transfer function. The adjustment of the feed-forward attenuators can be accomplished automatically as in the nonrecursive equalizer, but the adjustment of the feedback attenuators is not as readily accomplished for two reasons. If the amount fed back exceeds unity, the equalizer becomes unstable. Furthermore, the error obtained is not necessarily a convex function of the attenuator adjustments except in certain ranges. Accordingly, relatively complex techniques, which are expensive to implement, must be devised to insure proper operation of the recursive filter.

Two noteworthy disadvantages of the prior art nonrecursive equalizer have been identified. One is noise enhancement. Such enhancement tends to occur because noise present in the input signal is propagated down the delay line and, after some attenuation, is added to the largely unattenuated signal occurring at the reference tap. From every nonzero attenuator setting a degree of noise enhancement can thus result. The other is extension of the equalized impulse response over more symbol intervals than the unequalized response due to the fact that each echo of the original impulse being equalized produces a secondary echo of its own in the summation processes of the equalizer.

The recursive filter can be constructed in such a way that the signal operated on by the feedback attenuators is largely noise-free. This occurs when a separate tapped delay line fed by a quantized postdecision signal is used with the feedback attenuators. In the absence of decision errors the noise enhancement for equivalent numbers of taps is thus typically less than half that obtained in known nonrecursive equalizers and lagging echoes are substantially eliminated. On the other hand, this type of recursive filter is subject to an error-propagation penalty in that an error in the decision circuit once fed back corrupts at least as many subsequent data samples as there are feedback attenuators. In fact, initial errors may corrupt later data samples by being fed back more than once.

SUMMARY OF THE INVENTION

It is an object of this invention to improve the performance of the nonrecursive equalizer in the presence of noise.

It is another object of this invention to obtain the reduced noise capability of the recursive equalizer in a nonrecursive structure while preserving the inherent convergence properties of the latter.

It is still another object of this invention to eliminate substantially the tendency of nonrecursive equalizers for synchronous data transmission systems to disperse the system impulse response over a greater time interval than it originally occupied.

It is yet another object of this invention to gain the reduced noise susceptibility of the recursive equalizer in a nonrecursive structure while eliminating the error propagation penalties of the former.

According to this invention, nonrecursive delay-line transversal equalizers are connected in cascade. In a preliminary equalizer a linearly distorted received signal enters the delay line which has a plurality of taps equally spaced by the data symbol interval. At each tap, the sampled signal components are fed through variable attenuators. The resultant attenuated outputs are combined to form an output from which a preliminary decision concerning the probable nature of the transmitted signal can be made. The difference between the analog input and the quantized output of the decision circuit becomes an index of distortion for control of the tap attenuator settings.

In a final equalizer the output of the preliminary decision circuit, now essentially noise-free because quantized, enters another delay line with equally spaced taps. At each tap, except one in the reference position which is not used, sampled signal components are fed through additional variable attenuators. The attenuated outputs are combined in the final equalizer with the original received signal delayed by an appropriate amount to align the principal sample with its preceding and following echoes. The summed output of the preliminary equalizer is not applied to the reference position on the final equalizer because of possible contamination by enhanced noise. The new summation is sliced to obtain the equalized output. The attenuators are adjusted as in the preliminary equalizer to minimize the mean-square error indicated by the difference between the input and output of the decision circuit. In the final equalizer the signal propagated through the delay line, in the absence of decision errors, is free of noise and impulse response echoes. Accordingly, the equalized output is optimized with respect to both leading and lagging echoes and also with respect to equalizer-induced noise. Furthermore, there is no feedback associated with either the preliminary or final sections of this equalizer, and error propagation problems do not arise. Error multiplication is unlikely in normal practical circumstances when no echo exceeds half the magnitude of the principal response sample.

A feature of this invention is that the improved adaptive equalizer can be implemented by digital apparatus according to fully convergent algorithms.

DESCRIPTION OF THE DRAWING

The above and other objects and features of this invention will be appreciated from a consideration of the following detailed description and the drawing in which.

DETAILED DESCRIPTION

Figure 1:
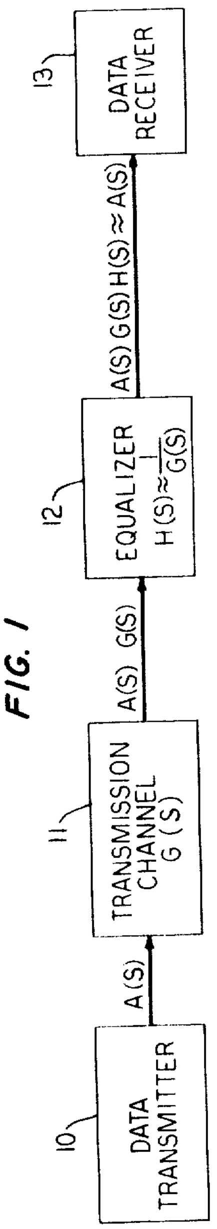
FIG. 1 is a block diagram of a representative data transmission system to which the equalizer of this invention is adaptable.

FIG. 1 is a generalized block diagram of a transmission system for conveying sampled data from a transmitter 10 over a transmission channel 11 to a receiver 13. A practical channel 11, such as the voice or carrier channels of the commercial telephone system, introduces linear distortion in the transmitted signal, which may be represented as the complex frequency transform A(s). Channel 11 has the complex transfer function G(s) (ratio of output to input immittances). The output of channel 11 operates on input A(s) to form the product A(s)G(s). In order for receiver 13 to make the most reliable decision about the transmitted signal, its input should be as closely as possible the signal A(s). Thus, an equalizer 12 is provided between channel 11 and receiver 13. The equalizer has the controllable transfer function H(s) by means of which the attempt is made to make channel 11 transparent to the signal A(s). Equalizer 12 is provided to approximate the reciprocal of the transfer function G(s) of channel 11 in accordance with a suitable distortion criterion. The equalizer disclosed in the aforementioned Lucky patent minimizes the function $$E^2 = \int_{-\infty}^{\infty} |G(j\omega)H(j\omega) - 1|^2 |W(j\omega)|^2 \, d\omega,$$

where $E$ = distortion error, $\omega$ = angular frequency, $G(j\omega)$ = frequency response characteristic of the transmission channel, $H(j\omega)$ = frequency response of the equalizer; and $W(j\omega)$ = a spectral weighting function which confines the effect of the equalization operation to a frequency band of interest.

For synchronous digital data systems the error is measured by sampling at baud or symbol intervals.

Figure 2:
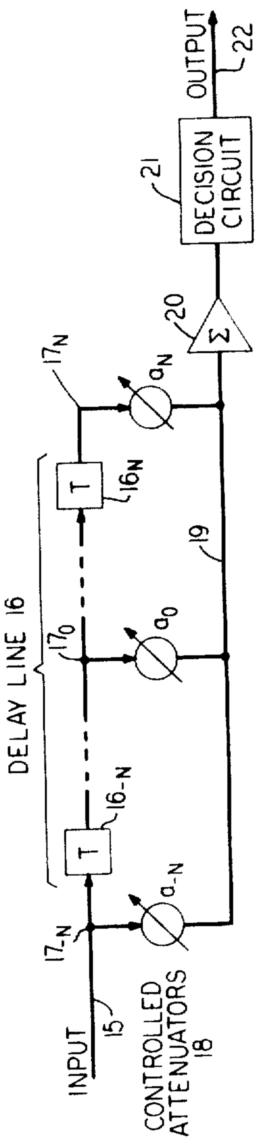
FIG. 2 PRIOR ART
FIG. 2 is a simplified schematic diagram of a nonrecursive equalizer structure known to the prior art.

FIG. 2 is a simplified diagram of a known nonrecursive equalizer. By nonrecursive is meant that no part of the output is mixed with the input, i.e., there are no feedback paths. The equalizer comprises a delay line 16 having taps such as those designated $17_{-N}$, $17_0$ and $17_N$, spaced at the synchronous data symbol or baud interval. At each tap there is located a controlled attenuator 18 having a positive and negative range of adjustment. The outputs of the several attenuators 18 are combined on bus 19 and summed in summing circuit 20 for application to decision circuit 21, where slicing operations are performed to obtain a data output on lead 22.

The input signal applied on lead 15 propagates down delay line 16. At each tap 17 the signal is multiplied by a variable factor or weighting coefficient $a_i$. The summation of the resultant outputs is the equalized signal. The reference tap attenuator, having weighting coefficient $a_0$, is frequently standardized at unity. The equalizer may be made automatic in respect of attenuator control and adaptive to received data by adjusting attenuators $a_i$ in accordance with a correlation of the difference between the input and output signals at decision circuit 21 with the respective tap outputs, as disclosed, for example, in the cited Lucky patent.

It can be shown that the nonrecursive equalizer strives to create a flat amplitude-frequency spectrum (or sampled spectrum in the case of synchronous systems) at its output. Consequently the signal-to-noise ratio at the equalizer output is invariably less than that at the input. This reduction effect can be considered noise enhancement and arises by virtue of the fact that noise present at the input is also present at each delay line tap and, after being attenuated by the factors $a_i$, is added back to the reference tap signal. In general, if any $a_i$ factor is nonzero in an equalizer with a finite number of taps, noise enhancement can result.

As is known, the impulse response of a band-limited channel is dispersed in time so that synchronous samples generally produce a main response and leading and lagging echoes of the main response. When equalization of this dispersed response is attempted in a nonrecursive structure of the type shown in FIG. 2, the echoes themselves produce secondary echoes so that the equalized response can be dispersed over as many more signaling intervals in excess of the number of delay-line taps as there are echoes. This extension of the equalized time-domain distortion beyond the range of the unequalized distortion is generally undesirable, because more delay taps are required to attain a given degree of equalization or error performance than otherwise.

Figure 3:
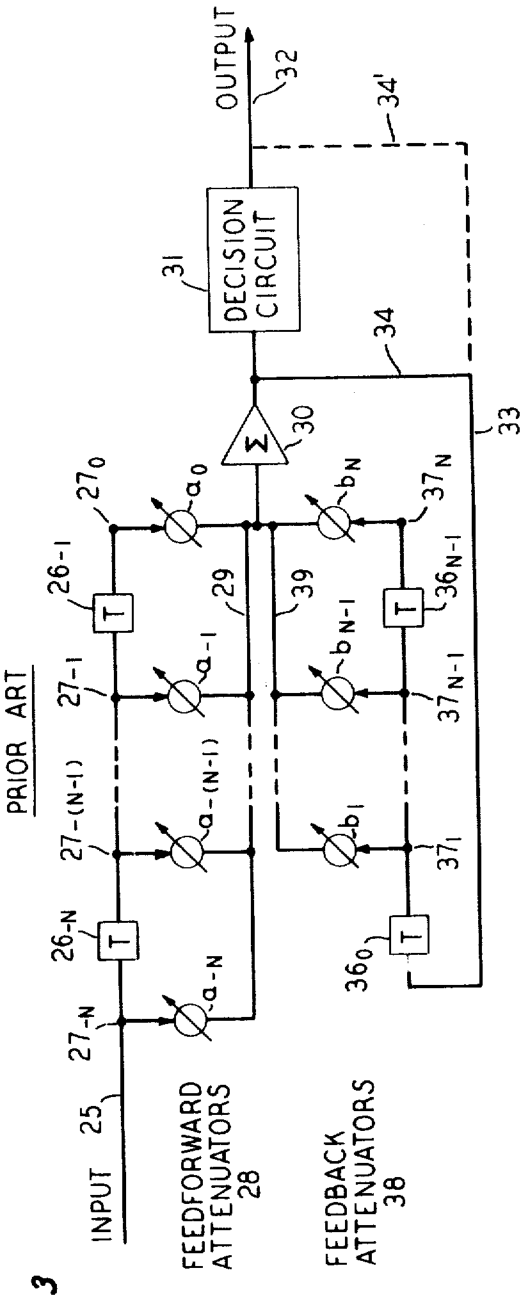
FIG. 3 is a simplified schematic diagram of a recursive equalizer structure known to the prior art.

FIG. 3 is a block schematic diagram of a known form of recursive equalizer structure. The upper portion, comprising delay units, such as $26_{-N}$ and $26_{-1}$ separating taps $27_{-N}$ from $27_{-(N-)}$ and $27_{-1}$ from $27_0$, which in turn are connected to combining circuit 30 and decision circuit 31 by way of controllable feed-forward attenuators 28, is substantially identical to the left half of the equalizer of FIG. 2. This much of the equalizer determines the zeros of the transfer function in the same way as that in FIG. 2 and has the same inherent noise enhancement problem. However, placing the reference tap $27_0$ to the right at the input to combiner 30 compensates for, but does not completely cancel, leading echoes in the channel impulse response. Lagging echoes are dispersed beyond the range of this portion.

The lower portion of FIG. 3 illustrates the recursive structure, which differs essentially from the nonrecursive structure only in having its input derived from the output of combining circuit 30 rather than from the input lead 25. The recursive structure comprises a delay line including such symbol-interval delay units as those designated $36_0$ and $36_{N-1}$ and taps $37_1$, $37_{N-1}$ and $37_N$; feedback attenuators 38 providing weighting coefficients such as $b_1$, $b_N$; and summing bus 39. Summing bus 39 terminates at the input of combining circuit 30. Summing buses 29 and 39 can obviously be combined. The input to left-hand delay unit $36_0$ is obtained over leads 33 and 34 from the output of combining circuit 30.

Since there exist settings for weighting coefficients $b_i$ of attenuators 38 for which the lagging echoes of a distorted impulse response can be completely eliminated without dispersion beyond the range of delay units 36, the structure of FIG. 3 is capable of minimizing leading echoes and eliminating lagging echoes. However, the same noise enhancement occurs in both recursive and nonrecursive portions. It has been found, nevertheless, that the recursive portion can function properly when the input is taken from the output of decision circuit 31 at output 32 over lead 34'. Substantially no noise is then present at the output of decision circuit 31 because it is in effect a pulse regenerator or quantizer. In this form the equalizer circuit of FIG. 3 is known as the decision-feedback equalizer. This equalizer has a finite noise advantage over the nonrecursive structure of FIG. 2, but retains the stability and error propagation problems of other recursive structures.

Figure 4:
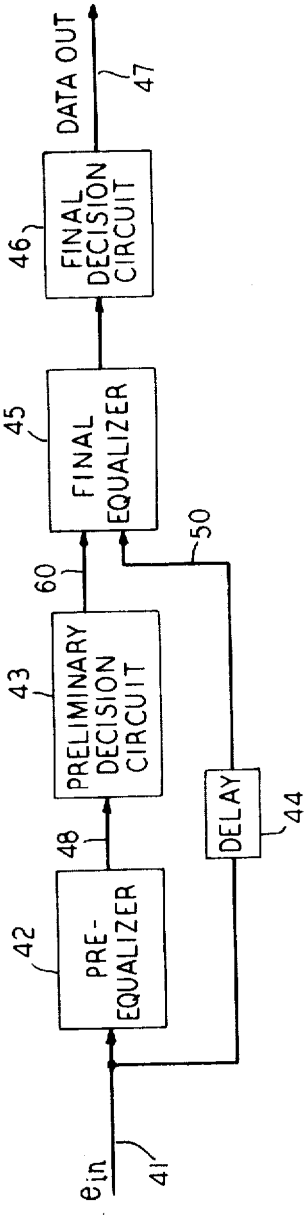
FIG. 4 is a simplified block diagram of the improved nonrecursive equalizer of this invention.

The improved equalizer of this invention is shown in bock form in FIG. 4. This equalizer extends the noise enhancement advantages of the decision-feedback equalizer to both leading and lagging echoes, while retaining the convergence properties of the Lucky equalizer. The improved equalizer comprises two equalizers of the general form described by Lucky connected in cascade. Two critical provisions in the cascade connection eliminate the noise enhancement problem. The cascade equalizer comprises a preliminary equalizer 42 having a single input 41 and a single output 48 supplying a preliminary decision circuit 43 in cascade with a final equalizer 45 with two inputs 50 and 60 and supplying a final decision circuit 46. The critical provisions are the two inputs specified for final equalizer 45. Input 60 supplies the delay-line portion of final equalizer 45 with a noise-free, partially equalized signal which is also free of echoes. Input 50 supplies the reference tap of final equalizer 45 with the input signal delayed in delay unit 44 by the amount necessary to align the signal being equalized with the same echo positions at the reference taps of both equalizers. Since the enhanced noise in the output of preliminary equalizer 42 on line 48 is virtually eliminated in the quantized or normalized output of preliminary decision circuit 43, there is no noise being propagated down the delay line of final equalizer 45. The only noise contaminating the final equalizer is that from the original input and that noise is incident only at the reference tap where no enhancement can occur. Furthermore, as long as no echo of the signal being equalized exceeds the threshold level of preliminary decision circuit 43, there is no secondary echo of an echo in the final equalizer to extend the range of the equalized impulse response in the output of equalizer 45 beyond the range of the impulse response of the unequalized received signal.

Figure 5:
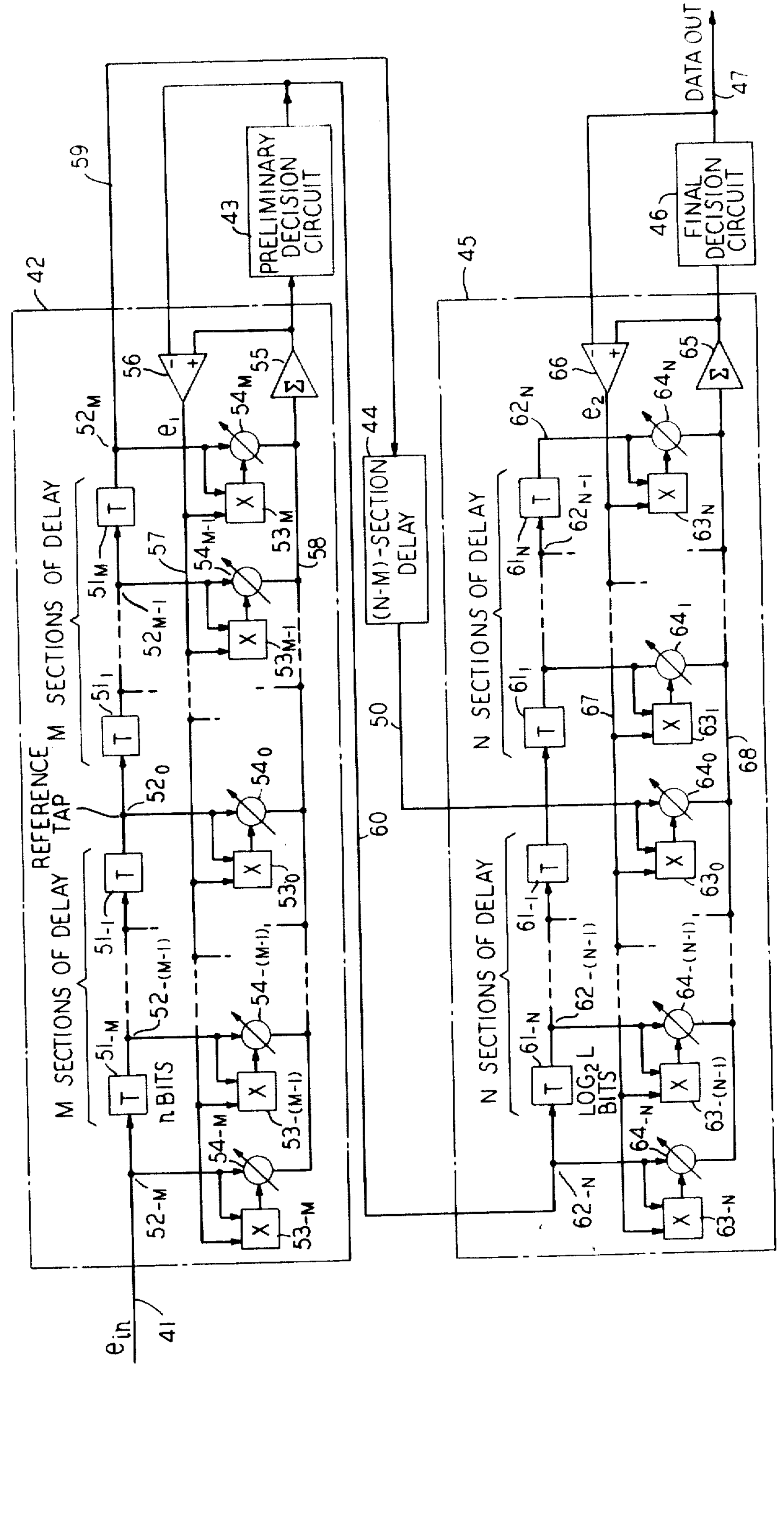
FIG. 5 is a block schematic diagram of the cascade adaptive nonrecursive equalizer of this invention.

FIG. 5 is a schematic block diagram of a complete nonrecursive cascade equalizer according to this invention. The equalizer of FIG. 5 is the equivalent of that in FIG. 4 with the contents of the preliminary equalizer block 42 and final equalizer block 45 implemented in exemplary fashion. Each equalizer comprises a delay line having a plurality of delay units 51 or 61 with delay times equal to the symbol or baud interval T; a plurality of taps 52 or 62 preceding and following each delay unit; a variable attenuator 54 or 64 at each tap; a plurality of correlators 53 or 63 associated with each attenuator; a summing bus 58 or 68; a summing circuit 55 or 65; and a difference circuit 56 or 66. It is to be particularly observed that there is no reference tap on the final equalizer, i.e., between delay units $61_{-1}$ and $61_{1}$. The two delay lines are shown as symmetrical, as is the usual case, but there are conceivable conditions when symmetry would not be required due to the distortion characteristics of a particular transmission channel. The number of delay units in each equalizer may or may not be equal according to circumstances.

Equalizers 42 and 45 supply the summation of their tap outputs attenuated by selected gain factors to respective decision circuits 43 and 46 where the data are regenerated or quantized. The differences between inputs and outputs of the respective decision circuits 43 and 46 form error signals $e_1$ and $e_2$ in the outputs of difference circuits 56 and 66. These error signals are multiplied in correlators 53 and 63, respectively, to form adjustment signals for associated attenuators 54 and 64. Correlators 53 and 63 form a product signal to establish both direction and magnitude of attenuator adjustment required to minimize the contribution of each tap output to the error signal. Attenuator adjustment may be incremental or proportional according to well-known principles.

The output of preliminary decision circuit 43 provides the noise- and echo-free input over lead 60 to the delay line in final equalizer 45. Since the reference tap of final equalizer 45 is not used, the input signal for attenuator $64_0$ must correspond with the position of the principal sample of the signal being equalized. This involves placing the signal representing a given decision by circuit 43 and appearing on lead 60 at the reference location at attenuator $64_0$ at the same time as its echo leading by M symbol intervals is M symbol intervals to the right of the reference location in final equalizer 45. Delay unit 44 in tandem with output lead 59 provides this means. The total delay appearing between reference locations on the two equalizers is thus the sum of the half-lengths of both equalizers. If the half-lengths are equal, no additional delay means are required. If the half-length of final equalizer 45 is greater than that of preliminary equalizer 42, then an additional delay equal to their difference in half-lengths is required. In FIG. 5 this additional delay of (N-M) units is provided in element 44. In the event that M is greater than N then input 50 can advantageously be connected to an intermediate taps such as tap $52_{M-1}$ in the event M is one unit greater than N.

The output of final decision circuit 46 on lead 47 is the equalized output of the system.

Where the implementation of the delay portions of the equalizers is digital, such as by shift registers, the number of stages required for each unit 51 in preliminary equalizer 42 is equal to the number *n* of bits required to characterize each distorted symbol precisely, but for each unit in final equalizer 45 the number of stages required is only that necessary to match the number of binary positions for encoding L levels, namely, $\log_2 L$. For eight-level transmission, for example, L=8, and the number of stages per delay unit is 3.

The following table compares the relative advantages and disadvantages of the prior art nonrecursive, the decision-feedback recursive and cascade nonrecursive equalizers:

| Limitations | Prior Art Nonrecursive Equalizer | Prior Art Recursive Equalizer | Cascade Nonrecursive Equalizer |
|---|---|---|---|
| Stability Problems | None | Possible | None |
| Convergence Problems | None | Possible | None |
| Spreading of Distortion Range | Yes | Yes for Leading Echoes | No |
| Noise Enhancement | Yes | Partial | No |
| Error Propagation | No | Yes | No |
| Degradation For Input Echoes 0.5 | No | Yes | Yes |

The cascade equalizer of this invention overcomes in large measure the problems of two types of prior art equalizers. While error propagation per se is eliminated in the cascade equalizer, error multiplication remains possible. However, the probability of its occurrence is minor when the 0.5 magnitude echo requirement is met. When it does occur, the multiplication is confined to the length of the final equalizer. Only the problem of degradation in performance for input echoes equal to or greater than half the principal sample remains unsolved. However, there are many practical applications, especially in the field of data transmission, where the probability of an echo exceeding half the amplitude of the main sample is extremely rare.

What is claimed is:

1. An adaptive equalizer for distorting data transmission channels characterized by reduced noise susceptibility comprising
   - a preliminary transversal filter including a first tapped delay line,
   - a single input to said first delay line for distorted data signals,
   - an output for said preliminary filter providing a substantially noise-free quantized digital output signal partially compensated for intersymbol interference distortion,
   - a final transversal filter including a second tapped delay line and a summing bus for selectively attenuated tap signals,
   - a first input on said final filter to said second tapped delay line,
   - a second input on said final filter to said summing bus,
   - first means for applying the quantized output signal from said preliminary filter to the first input on said final filter,
   - second means for applying distorted data signals to the second input on said final filter, and
   - fixed delay means in series with the second input on said final filter to maintain time synchronism between data signals applied respectively to said preliminary and final filters.

2. The adaptive equalizer as defined in claim 1 in which said first and second delay lines each comprise
   - a plurality of equal delay units separated by taps spaced at intervals equal to the symbol interval of synchronous data signals to be equalized, and
   - means at each tap for correlating an error difference signal with the tap output signal to determine a direction of adjustment for the attenuator thereat.

3. The adaptive equalizer as defined in claim 1 in which said fixed delay means provides a delay time equal to half the sum of the respective delays of said first and second tapped delay lines.

4. A nonrecursive transversal equalizer for synchronous data transmission systems comprising first and second transversal equalizer sections, each section including a delay line with synchronously spaced tap therealong, a first input point for each of said delay lines, a selectively adjustable attenuator for each tap, combining means for attenuated tap signals, quantizing means for forming an output signal in which the mean-square error difference between combined and quantized signals is minimized, a second input point on said second equalizer section connected to the combining means thereon, first means for applying unequalized signals directly to the first input point on said first equalizer section, second means for applying unequalized signals after a predetermined delay time to said second input point, and means for connecting the substantially noise-free output signal from said first equalizer section to said first input point on said second equalizer section, the output signal from said second equalizer section being the final equalized output of said equalizer.

5. The transversal equalizer of claim 4 in which the predetermined delay time preceding said second input point on said second equalizer section is half the total delay of both said equalizer sections.

* * * * *